(12) United States Patent  
Moriarty

(10) Patent No.: US 7,029,612 B2
(45) Date of Patent: Apr. 18, 2006

(54) RELEASE AGENT FOR LIGNOCELLULOSIC COMPOSITES

(75) Inventor: Christopher J. Moriarty, Mullica Hill, NJ (US)

(73) Assignee: Huntsman International LLC, Salt Lake City, UT (US)

( * ) Notice: Subject to any disclaimer, the term of this patent is extended or adjusted under 35 U.S.C. 154(b) by 34 days.

(21) Appl. No.: 10/759,482

(22) Filed: Jan. 16, 2004

(65) Prior Publication Data

US 2004/0146654 A1    Jul. 29, 2004

Related U.S. Application Data

(63) Continuation of application No. PCT/US02/22730, filed on Jul. 17, 2002.

(60) Provisional application No. 60/306,495, filed on Jul. 19, 2001.

(51) Int. Cl.
    *B27N 3/20*    (2006.01)
(52) U.S. Cl. .................... 264/109; 156/331.7; 264/125; 428/405; 428/450; 528/26; 524/366
(58) Field of Classification Search ................ 264/109, 264/123, 125, 126, 169, 257, 337, 338; 524/284
    See application file for complete search history.

(56) References Cited

U.S. PATENT DOCUMENTS

| 4,024,090 A | 5/1977 | Von Bonin et al. |
| 4,110,397 A | 8/1978 | Wooler |
| 4,528,154 A | 7/1985 | Nguyen et al. |
| 4,539,166 A | 9/1985 | Richartz et al. |
| H444 H | 3/1988 | Roth et al. |
| 4,740,575 A | 4/1988 | Nguyen et al. |
| 4,742,144 A | 5/1988 | Nguyen et al. |
| 4,772,442 A | 9/1988 | Trout et al. |
| 4,933,232 A | 6/1990 | Trout et al. |
| 4,973,620 A | 11/1990 | Ona et al. |
| 5,726,241 A | 3/1998 | Maruyama et al. |
| 5,916,939 A | 6/1999 | Gillis et al. |
| 6,451,905 B1 | 9/2002 | Spyropoulos et al. |
| 6,475,974 B1 * | 11/2002 | Leboucher et al. ......... 510/417 |
| 6,962,963 B1 * | 11/2005 | Kumar et al. .................. 528/26 |

FOREIGN PATENT DOCUMENTS

| EP | 0 269 869 | 6/1988 |
| JP | 49023259 | 3/1974 |
| WO | WO 95/23056 | 8/1995 |
| WO | WO 98/00464 | 1/1998 |
| WO | WO 00/55242 | 9/2000 |

* cited by examiner

*Primary Examiner*—Marc S. Zimmer
(74) *Attorney, Agent, or Firm*—Nicole Graham

(57) ABSTRACT

Novel release agents comprising a carboxylic acid comprising at least six carbon atoms and at least one free carboxylic acid group and a polysiloxane comprising at least one organically bound active hydrogen group, which release agents are particularly suited for use in forming lignocellulosic composites prepared using an isocyanate adhesive. Processes for the use of such release agents in the synthesis of lignocellulosic composites prepared using isocyanate adhesives.

12 Claims, 1 Drawing Sheet

RELEASE AGENT FOR LIGNOCELLULOSIC COMPOSITES

CROSS REFERENCE TO RELATED APPLICATIONS

This application is a continuation of international application PCT/US02/22730, filed Jul. 17, 2002, and claims priority to U.S. Provisional Application, Ser. No. 60/306,495, which was filed on Jul. 19, 2001.

FIELD OF THE INVENTION

The invention relates to novel release agents that are particularly suited for use in the synthesis of lignocellulosic composites prepared using isocyanate adhesives.

BACKGROUND

The manufacture of compression molded composites from a mixture of wood chips or fibers and a polyisocyanate binder is well known. The isocyanate binders are excellent adhesives for the wood fibers, but they also promote unwanted adhesion of the composite boards to the metal press platens. Efforts to develop a release agent composition that will provide multiple press cycles have consumed decades of research, with only modest success. For any release agent to be effective it must provide at least a limited capability for multiple press cycle operation. This is because, at minimum, there are mistakes and interruptions in the spraying of external mold release agent between pressing cycles that could result in catastrophic press sticking, if there were not at least some effective amount of mold release residue on the platens from a previous molding cycle. This is called "release memory". In addition to this minimum requirement, there is a strong economic driving force for the reduction or elimination of the need for mold release treatment of the press platens between pressing cycles. Clearly, the more cycles that can be achieved between mold release applications, the faster and more economical the overall process will be.

Conventional release agents long used in the polyurethane industry, such as fatty acids and salts thereof, do not provide satisfactory release memory or the capability of running multiple press cycles between release treatments.

Specialized external release agents and internal/external combinations have been reported that can provide release memory and multiple cycling capability. Some of these require elaborate and costly processes for pre-treatment of the press platens, such as multiple coating and baking the platens. Still other release agent systems that can provide multiple release capability and release memory must still be applied with sufficient frequency that they begin to build up on the platens. Release agents based on waxes or silicones exhibit this problem. The buildup must be removed periodically, or it will cause surface defects on the pressed boards. The removal of press buildup involves a complex and expensive cleaning process, which interrupts production. Some examples of known release agent compositions include those disclosed in U.S. Pat. No. 4,110,397; U.S. Pat. No. 4,742,144; U.S. Pat. No. 4,740,575; U.S. Pat. No. 4,528,154; U.S. Pat. No. 4,772,442; U.S. Pat. No. 4,933,232; U.S. Pat. No. 4,539,166; U.S. Pat. No. 4,024,090; USH 000444; EP 269869; WO 98/00464; and JP 49023259. Despite all of this known release technology, which has been available for years, a satisfactory solution to the release problem for fully isocyanate bonded compressed wood composites (such as oriented strand board, OSB) is still not in hand.

In applications where isocyanate binders are currently used (including OSB) it is still necessary to apply a surface layer of a non-isocyanate bonded composite wood material, interposed between the platen surface and the isocyanate-bonded "core" of the board, in order to prevent unwanted adhesion. This complicated surface-core sandwiching process has increased the cost of board manufacturing, and has prevented the industry from realizing the full benefits of isocyanate binders. The known advantages of using isocyanate adhesives include improved board physical properties.

Clearly there is a need for an improved release agent composition that can provide multiple release capability (release memory) using a simple application process, and that does not cause excessive press buildup. The present invention provides such an improved release agent composition, and an improved process for making isocyanate bonded lignocellulosic composites that can use the isocyanate binder in both the core and the surface layers of the composite board.

SUMMARY OF THE INVENTION

One embodiment of the invention is an improved process for producing composite lignocellulosic articles comprising the steps of:
A) providing a lignocellulosic material in fibrous or particulate form;
B) providing a pressing means having at least one metal press member having an inner surface and an outer pressing surface;
C) providing an isocyanate containing adhesive;
D) providing a release agent composition comprising a combination of,
   i) at least one carboxylic acid compound of six carbon atoms or more, said carboxylic acid compound containing at least one free carboxylic acid group, and
   ii) at least one compound containing a plurality of siloxane linkages, said compound further containing at least one active hydrogen functional group bound to carbon, wherein said carboxylic acid compound and said active hydrogen functional group containing siloxane compound are separate molecular species;
E) causing said release agent composition to be applied onto at least a portion of the outer pressing surface of at least one metal press member on said pressing means, to form at least one release agent treated pressing surface;
F) combining said lignocellulosic raw material with said isocyanate containing adhesive, to form a loose mass having free organically bound isocyanate groups present thereon;
G) pressing said loose mass into a solid shaped object by using the at least one release agent treated pressing surface; and
H) releasing said solid shaped object from said treated pressing surfaces.

In an aspect of the invention the at least one release agent treated pressing surface is maintained at a temperature of from 200 to about 500° F. during the pressing operation.

A second embodiment of the invention is a reaction system suitable for the production of lignocellulosic composites from fibrous or particulate lignocellulosic raw materials by an improved pressing process, the reaction system comprising:

A) an adhesive containing free organically bound isocyanate groups;
B) a release agent composition comprising a combination of
   i) at least one carboxylic acid compound of six carbon atoms or more, said carboxylic acid compound containing at least one free carboxylic acid group, and
   ii) at least one compound containing a plurality of siloxane linkages, said compound further containing at least one active hydrogen functional group bound to carbon, wherein said carboxylic acid compound and said active hydrogen functional group containing siloxane compound are separate molecular species.

A third embodiment of the invention is a release agent composition, particularly suitable for use in an improved process for the manufacture of consolidated lignocellulosic articles using isocyanate adhesives, said release agent composition comprising:
A) at least one carboxylic acid compound of six carbon atoms or more, said carboxylic acid compound containing at least one free carboxylic acid group; and
B) at least one compound containing a plurality of siloxane linkages, said compound further containing at least one active hydrogen functional group bound to carbon, wherein said carboxylic acid compound and said active hydrogen functional group containing siloxane compound are separate molecular species.

In a preferred aspect of this third embodiment, the carboxylic acid compound and the separate active hydrogen functional group containing siloxane compound are dispersed or dissolved together in a carrier and applied directly to the metal press surfaces, and/or onto the loose mass of lignocellulosic raw material, prior to pressing as an external release agent. In a particularly preferred aspect of this embodiment the carrier consists essentially of water. In this particularly preferred aspect, an optional emulsifying agent may be used to improve the stability of the water-based release agent treatment composition and inhibit the separation of the active ingredients therefrom.

It has unexpectedly and surprisingly been discovered that the new release agent composition of the invention provides the desired combination of release memory and dramatically reduced press buildup during the manufacture of press consolidated lignocellulosic composite boards from isocyanate based adhesives. This discovery has resulted in a substantial advance over the prior art.

DETAILED DESCRIPTION OF THE INVENTION

Figure 1:
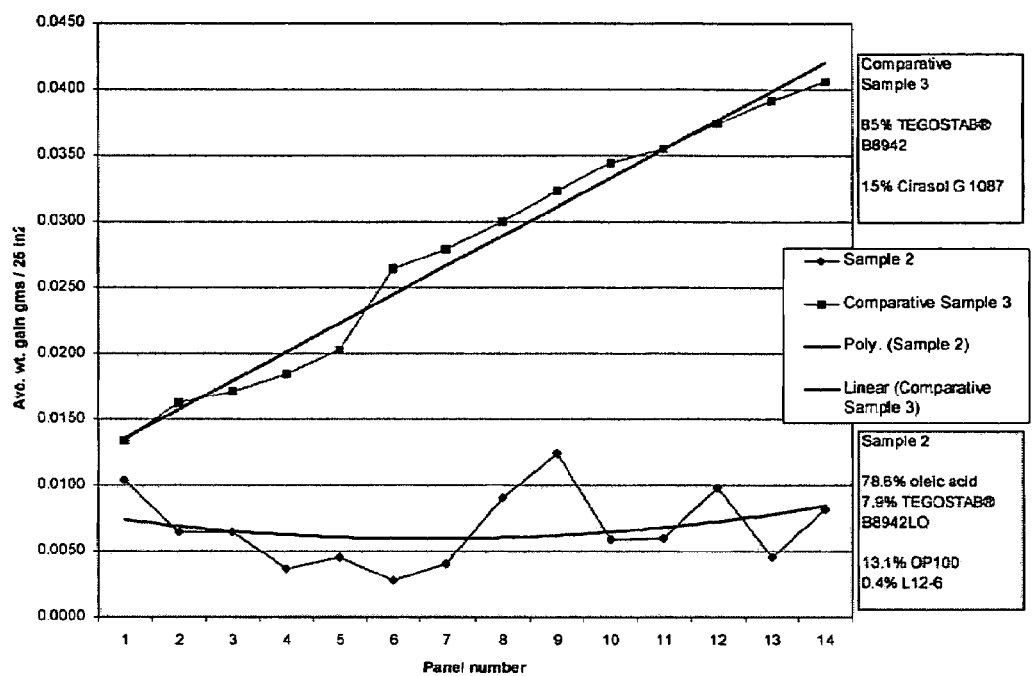
FIG. 1 shows the build up of release agents.

A feature of the invention is the use of a release agent which comprises, as separate molecular entities, a carboxylic acid compound containing at least six carbon atoms and comprising at least one free carboxylic acid (—COOH) group; in combination with a polysiloxane compound bearing at least one organically bound active hydrogen group, said active hydrogen group having the capability of reacting with organically bound isocyanate (—NCO) functionality.

The carboxylic acid component may be a single carboxylic acid compound or a mixture of such compounds. If a mixture is used, then the individual components of the mixture should all preferably meet the specifications as to the structure of the carboxylic acid compound, as noted above and further elaborated below.

The carboxylic acid compound has at least six carbon atoms, preferably 8 to 60 carbon atoms, more preferably 10 to 55 carbon atoms, still more preferably 12 to 40 carbon atoms, even more preferably 15 to 30 carbon atoms, and most preferably 18 to 22 carbon atoms. The carboxylic acid compound does not contain any siloxane linkages. The carboxylic acid compound preferably contains only aliphatic carbon atoms. It is preferably free of atoms other than carbon, hydrogen, and oxygen. The carboxylic acid compound must contain at least one free —COOH group bound to carbon, but may contain more than one such group. The preferred carboxylic acid compound contains from one to 10 carboxylic acid groups, but more preferably from one to 3, still more preferably from one to 2, and most preferably just one carboxylic acid group per molecule. The more preferred carboxylic acid compounds are linear aliphatic monocarboxylic acids. Still more preferred are linear aliphatic monocarboxylic acids that are liquid at 25° C. and are free of atoms other than carbon, hydrogen, and oxygen. Still more preferred are such liquid linear aliphatic carboxylic acids that are also free of alcohol groups. A particularly preferred class of carboxylic acid compounds suitable for use in the invention are unsaturated C-18 linear aliphatic carboxylic acids containing from one to three units of unsaturation in the form of C=C bonds. Most preferred unsaturated carboxylic acids are those which contain one or two units of C=C unsaturation, such as oleic acid.

Examples of carboxylic acids suitable for use in the combination release agents for use in the invention are oleic acid, linoleic acid, linolenic acid, ricinoleic acid, lauric acid, stearic acid, adipic acid, dimer or trimer fatty acids, 2-ethyl-1-hexanoic acid, montanic acid, palmitic acid, sebacic acid, mixtures of these, and the like. Examples of particularly preferred carboxylic acids suitable for use in the invention include the linear fatty monocarboxylic acids, most preferably those which are liquid at 25° C. Oleic acid is most preferred.

The active hydrogen group containing polysiloxane compounds suitable for use in the combination release agents according to the invention may be single compounds or they may be mixtures of such compounds. If a mixture of polysiloxane compounds is used, then the individual components of the mixture should all preferably meet the specifications as to the structure of the polysiloxane compound as noted above, and as elaborated further below.

The polysiloxane compound contains a plurality of siloxane linkages and at least one, preferably two or more, active hydrogen groups attached to carbon atoms, per molecule. The active hydrogen groups are of a type capable of reacting with organically bound isocyanate (—NCO) groups. Preferably all of the active hydrogen groups in the molecule are bound to carbon atoms. The preferred number of active hydrogen groups in the polysiloxane molecule is from 2 to 50, more preferably from 2 to 20, still more preferably from 2 to 10, even more preferably from 2 to 8, and most preferably from 2 to 6. The most preferred types of active hydrogen groups are those selected from the group consisting of primary alcohol groups, secondary alcohol groups, primary amine groups, secondary amine groups, and combinations of these. The alcohol groups are most preferred. The polysiloxane compound is preferably free of carboxylic acid groups. The polysiloxane compound is preferably free of salts of carboxylic acid groups. The polysiloxane compound is preferably an aliphatic compound. The more preferred polysiloxanes are based on a polydialkylsiloxane main chain, the main chain containing organic substituents bearing the organically bound isocyanate reactive active hydrogen functional groups. A preferred polydialkylsiloxane main chain is polydimethylsiloxane. The more preferred polysiloxane compounds contain only the elements carbon, hydrogen, silicon, and oxygen. The most preferred polysiloxane compounds are polyether polysiloxane copolymers. It is desirable that the polysiloxane compound be liquid at 25° C. The preferred viscosity range for the polysiloxane compound is from 2 cps to 15000 cps at 25° C. In as aspect of the invention, the polysiloxane compound should desirably have a viscosity at 25° C. not greater than 1000 cps. An example of a preferred polysiloxane compound suitable for use in the invention is TEGOSTAB® B8942LO polyether polysiloxane copolymer containing alcohol groups, commercially available from Th. Goldschmidt & Company.

The carboxylic acid compound and the polysiloxane compound are separate and different molecular species when used, and are not prereacted together to form a covalently or ionically bonded product compound. The individual compounds in the combined release agent composition may however react with other species, most notably the isocyanate adhesive, during the manufacture of the lignocellulosic composite articles. The individual compounds in the combined release agent composition are combined in the sense that they must be used in combination, but they remain as separate and distinct molecular entities when the release agent is applied.

The combined release agent compositions according to the invention may be introduced into the lignocellulosic composite manufacturing process by any suitable means for using other kinds of release agent compositions. These means may include incorporation of the release agent composition into the isocyanate containing adhesive, onto the lignocellulosic fibrous or particulate raw material stream, application onto the pressing surfaces of the press used in preparing the lignocellulosic composite, or any combination thereof. The individual compounds within the combined release agent, namely the carboxylic acid and the polysiloxane, may be separated and physically combined later at the point of use. For example, it is possible to add one of these essential ingredients of the release composition to the isocyanate containing adhesive while adding the other to the lignocellulosic raw material stream. However it is more preferred that the two ingredients be mixed together, optionally with other species, prior to the point of use, and employed as a mixture.

The most preferred method for using the release agent combination according to the invention is as an external release agent. In this mode of use the two essential ingredients of the release agent are caused to be applied to at least a portion, preferably all, of the pressing surfaces used in the manufacture of the composite lignocellulosic articles. These surfaces requiring this treatment will of course vary depending upon the type of press used, but should include any caul plates, screens, press plate surfaces, or other component surfaces which are likely to come into contact with the isocyanate adhesive treated lignocellulosic raw material mass during the pressing operation. In this preferred mode of use, the two essential ingredients of the release agent may be applied sequentially or together to the pressing surfaces. Most preferably they are applied together as a mixture, optionally with other species such as carriers.

In order to insure adequate wetting of the surfaces to be treated, while avoiding over use of the external release agent composition, it is preferred to use at least one carrier. The carriers are preferably volatile species which are allowed to evaporate from the treated surface before the latter is used in the pressing operation. Preferred volatile carriers include water, monoalcohols of four carbons or less, hydrocarbons of six carbons or less, fluorinated hydrocarbons of five carbons or less, and mixtures of these. Particularly preferred carriers include water, ethanol, isopropanol, and mixtures of these. Water is the most preferred carrier.

The release agent combination and carrier may be applied to the pressing surfaces by any known means, including spraying, rolling, brushing, dipping, wiping, and combinations of these known methods. Spraying is particularly preferred.

Another preferred method for applying the release agent combination of the invention onto the press surfaces involves spraying the release agent onto the loose mass of lignocellulosic fibrous or particulate matter prior to pressing. This indirect method of release agent application may be used either by itself, or more preferably in combination with the direct treatment of the pressing surfaces as described above. This indirect method of application is best practiced with water as a carrier for the release agent composition. The water carrier, in this method, may either evaporate or be selectively absorbed into the lignocellulosic mass, leaving the release agent concentrated at the surfaces of the lignocellulosic fibers or particles.

The release agent combinations of the invention are preferably dissolved or emulsified in the carrier at a concentration sufficient to insure adequate coverage while providing a viscosity low enough to insure adequate wetting of the surfaces to be treated, including penetration of any surface defects such as minute cracks and scratches and the like. If the release agents are not fully soluble in the carrier, then it may be necessary to use one or more optional surfactants in order to insure that an emulsion is obtained which is stable and fine enough to provide for adequate and convenient surface coverage. The release agent emulsions in carrier should preferably be stable enough for at least one hour of storage without agitation, and more preferably stable enough for at least three hours of storage without agitation at 25° C. Ideally, the emulsified release agent compositions should be stable for weeks or months or more, in order to provide for the convenience of storage and shipping of the emulsions. However, it is fully within the scope of the invention to prepare the release agent emulsions at the point of use, with or without emulsifying agents, and use them immediately upon preparation;

Optional surfactants which may be used for dispersing the release agent combinations of the invention in carriers include any of the known categories of surfactants, including anionic surfactants, cationic surfactants, zwitterionic surfactants, nonionic surfactants, and combinations of these. Nonionic surfactants are preferred. Specific examples of preferred nonionic surfactants which may be used with aqueous carriers include ethoxylated alkylphenols, ethoxylated aliphatic linear alcohols, and mixtures of these. Examples of surfactants which are particularly suitable for use with water as a carrier include SURFONIC® OP 100 surfactant and SURFONIC® L12-6 surfactant, which are both commercially available from Huntsman Petrochemical Corporation. These examples are not to be construed as limiting. The separate ingredients in the combination release agent according to the invention may be used to produce separate emulsions which can be combined later, or they may be mixed and emulsified together. Those skilled in the art will recognize many variations on the basic scheme, without deviating from the scope of the invention. Those skilled will also appreciate the fact that the optimum concentration of the release agent package in carrier, as well as the levels and types of any optional emulsifying agents, will require optimization by procedures well known in the art, for any given situation. This routine optimization of mixtures will also be recognized as being within the scope of the invention.

The ratio by weight of the two ingredients of the combined release agent compositions according to the invention may vary considerably. The weight ratio of these ingredients (i.e., the carboxylic acid and the functional polysiloxane) in application is generally in the range of from 100:1 to 1:100, preferably from 20:1 to 1:20. It is more preferred however that the carboxylic acid ingredient be the major of the two ingredients by weight. The more preferred weight ratios of the carboxylic acid ingredient to the polysiloxane ingredient are from 100:1 to 1:1, more preferably from 50:1 to 2:1, still more preferably from 20:1 to 3:1, even more preferably from 15:1 to 4:1, and most preferably from 12:1 to 5:1. A particularly preferred weight ratio of the carboxylic acid compound to the polysiloxane compound is 10:1.

The total concentration of the combined release agent composition of the invention in the carrier may vary considerably, but typically ranges from 1 to 25% by weight of the total of the release agents plus carrier plus any optional emulsifying agents. This concentration is more preferably in the range of from 2 to 20% by weight of the total, more preferably from 3 to 15%, and most preferably from 5 to 10% by weight. Concentrates having much higher levels of the release agent package may optionally be used, and then diluted by adding more carrier at the point of use.

The isocyanate containing adhesive used in the manufacture of the lignocellulosic composites is a polyfunctional isocyanate, most typically an aromatic polyisocyanate. The aromatic polyisocyanates most widely used as adhesives in the manufacture of pressed lignocellulosic composites are MDI series polyisocyanates, most typically polymeric MDI. Polymeric MDI is a liquid mixture of several diphenylmethane diisocyanate isomers and higher functionality polymethylene polyphenyl isocyanates of functionality greater than 2. These isocyanate mixtures usually contain about half, by weight, of the higher functionality species. The remaining diisocyanate species present in polymeric MDI are dominated by the 4,4'-MDI isomer, with lesser amounts of the 2,4' isomer and traces of the 2,2' isomer. Polymeric MDI is the phosgenation product of a complex mixture of aniline-formaldehyde condensates. It typically contains between 30 and 32% by weight of isocyanate (—NCO) groups, and has a number averaged isocyanate group functionality of from 2.6 to 3.0.

It is however within the scope of the invention to use any polfunctional organic isocyanate adhesive. Non limiting examples of other types of polyfunctional isocyanates which may be used in practicing the invention include one or more members selected from the group consisting of aliphatic, araliphatic, aromatic, and heterocyclic polyisocyanates having number averaged isocyanate (—NCO) group functionalities of 2 or greater and organically bound isocyanate group concentrations of from about 1% by weight to about 60% by weight. The range of polyisocyanates which may be used includes prepolymers, pseudoprepolymers, and other modified variants of monomeric polyisocyanates known in the art which contain free reactive organic isocyanate groups. The preferred isocyanates are liquid at 25° C.; have viscosities at 25° C. of less than 10,000 cps, more preferably less than 5000 cps; and have concentrations of free organically bound isocyanate groups of from 10 to 33.6% by weight. The most preferred polyisocyanates are the MDI series isocyanates. The most preferred MDI series isocyanates include polymeric MDI and prepolymers, variations, or derivatives thereof which are known in the art.

The isocyanate containing adhesive may optionally be used in combination with other non-isocyanate type adhesives, but is more typically used alone. Typical total adhesive loadings range from about 1 to about 10% by weight of the lignocellulosic raw material, more commonly from about 1.5 to about 6%.

Non limiting examples of additional (non-isocyanate) adhesives, which may optionally be used in combination with the isocyanate adhesive, include aminoplast resins, phenolic resins, and combinations of these.

The lignocellulosic raw material, typically in the form of small chips, fibers, particles, or mixtures of these, is pretreated with the liquid polyisocyanate adhesive and tumbled in a blender in order to insure adequate distribution of the adhesive over the raw substrate. The isocyanate treated lignocellulosic raw material is then pre-formed into a loose mass prior to pressing. Aqueous release agent according to the invention may be sprayed onto the surface of this loose mass at this stage. The loose mass is then pressed while there is still a significant amount of unreacted isocyanate present. Pressing typically occurs within about an hour of forming, but may sometimes be as much as several hours later.

Pressing may be performed in batches, or it may be performed continuously by using a continuous press. Both modes of processing are well known in the art. Release memory and the reduction of press buildup are important to both modes of processing. The release agent combinations of the invention may be used successfully in both of these modes of pressing. The loose mass of wood pieces and adhesive are compressed and optionally heated in the press, to form a solid rigid consolidated shaped product such as a board. The consolidation process typically involves the application of both pressure and heat, although the invention may optionally be practiced using pressure alone. Hot pressing is typically conducted at press temperatures of between 200° F. and about 500° F., more typically 250° F. to 450° F., and most commonly from about 325° F. to 425° F.

The raw lignocellulosic feedstocks which may be used include chips, fibers, or particles of wood, or mixtures of these. These typically range in size from a few hundredths of an inch in length up to about six inches in length. The wood particles in the feed (furnish) may be fibrous in nature, or symmetrical, or combinations of these alternatives. A particularly preferred type of furnish suitable for use in the invention consists of relatively large wood chips and fibers, on the order of from 0.5 up to six inches in average length. These relatively large chips and fibers are used in the manufacture of oriented strand board (OSB), which is a very important product in the lumber industry.

Prior art methods of OSB manufacture which use isocyanate adhesives on an industrial scale have had to rely on the use of exterior layers bonded with an isocyanate free adhesive, such as a phenolic resin, in order to insure adequate release without buildup. In these prior art methods, the isocyanate binder was used only in the core of the board. This sandwich method adds complexity and cost to the overall OSB manufacturing process, and has prevented the industry from realizing the full benefits of the use of MDI isocyanate binders. Release technologies known in the prior art were not adequate to enable the industry to move to 100% isocyanate binders, throughout the board, and eliminate the sandwich method. The release agents of the present invention provide a combination of excellent release, release memory, and a dramatic reduction in release agent buildup.

These improvements have made it possible to manufacture OSB, on an industrial scale, with isocyanate adhesives as the sole binders. The use of 100% isocyanate binder is a substantial improvement in the art, and is clearly the most preferred mode for using the present invention.

The new release agent combinations of the invention may optionally be used in combination with other release agents known previously in the art. However it is preferred to use the new release agent combinations alone, in order to maximize the advantage regarding the reduction of press buildup.

It is also within the scope of the invention to employ other kinds of known optional additives in conjunction with the new release agent combinations. Non limiting examples of the types of optional additives which may be used include fire retardants; pigments; dyes; biocides; antioxidants; light stabilizers; expanding agents; inorganic fillers; organic fillers (in addition to lignocellulosic); relatively long reinforcing fibers and mats such as glass, metal, polymeric, or natural fibers and mats made therefrom; facing materials; ground plastics wastes (a specific type of organic filler); smoke suppressants; slack waxes; antistatic agents; combinations of these; and the like. The methods for using these and other known optional additives and specific instances thereof will be well understood by those skilled in the art.

Those skilled in the art will appreciate many possible variations within the scope of this invention. The invention is further illustrated by the following specific examples, which are not to be construed as limiting.

EXAMPLES

Example 1

Release Agent Preparation

A release agent was prepared at room temperature using a low shear hand mixing method. Ten grams of SURFONIC® OP 100 surfactant (Huntsman Petrochemical Corporation) was added to 60 grams of PRIOLENE® 6906 oleic acid (Unichema International Corp.) and mixed in a 250 ml beaker with a stirring rod by hand for 1 minute. In a separate beaker, 6 grams of TEGOSTAB® B8942LO polyether siloxane (Goldschmidt Company), was mixed with 0.3 grams of SURFONIC® L12-6 surfactant (Huntsman Petrochemical Corporation) for one minute. These mixtures were then allowed to stand for 30 minutes. Finally, the oleic acid mixture was added to the polysiloxane mixture. The mixture had the following characteristics:

| Characteristic | Measured value |
| --- | --- |
| % solids | 100 |
| viscosity (25 C.) | ~1 cps |
| appearance | Cloudy, yellow mixture |

Example 2

Emulsion Preparation

An aqueous release agent emulsion was prepared. Ninety grams of de-ionized water was added, in a sealable glass container, to 10 grams of the release agent mixture described in Example 1. The resulting aqueous mixture was then shaken for 2 minutes by hand. A milky-white emulsion with good separation stability was easily formed. The aqueous emulsion did not separate on standing for 4 hr at 25° C. without further agitation.

Example 3

Release Testing

OSB composite panels bonded with MDI based binders were pressed to test the release characteristic of the inventive release agents. Prepared and dried lignocellulosic fiber strands [wood flakes] were blended with 4% RUBINATE® M polymeric MDI (available from Huntsman Polyurethanes) in a rotary laboratory blender at a rate of 100 grams per minute. The polymeric MDI had a free —NCO content of 31.5% by weight and an —NCO group functionality of 2.7. A standard slack wax was then spray atomized on the flakes. The composition of the pre mix was:

5.5 Kg wood flakes (5.5% moisture content)
209 grams RUBINATE® M polymeric MDI
55 grams of paraffin slack wax (CIRE-778 obtained from Imperial Oil Ltd., of Canada).

Loose pre-formed mats of the blended flakes were then hand formed on a screen, and sprayed with 10 grams (at 10% solids, and at an application rate of 1 solid gram of release agent per sq. foot of mat surface) of the experimental release agent described in Example 2 above. Prior to pressing, the carbon steel pressing surfaces were ground down to expose the bare metal and then solvent cleaned with methylene chloride and dried. The loose ligncellulosic mats were then pressed in a PLC (Programmable Logic Controller) controlled hot press at a temperature of 250° C. using a pressing strategy of 60 second closing time, 180 second hold time, and 30 second decompression time. The pre-pressed (loose) mats were 30×30 cm and initially about 70 mm thick. These were pressed to a final thickness of 6.4 mm by using the bare steel platen surface directly (not pre-treated with release agent). All of the release agent in this example was applied to the loose pre-pressed wood flake mat surfaces. Following pressing, the cured OSB panels were removed from the press and evaluated qualitatively for release performance. Table I describes the system used in evaluating release performance:

TABLE I

| Rating | Description |
| --- | --- |
| 5 | Perfect release, no sticking to press |
| 4 | Slight sticking (in one spot usually) |
| 3 | Light-moderate hand pressure on scraper required for release |
| 2 | Moderate-heavy hand pressure on scraper required for release |
| 1 | Extreme hand pressure on scraper required for release |
| 0 | Completely adhered to metal surface, non-removable |

A series of OSB panels were pressed, one after another, to evaluate release. Each press load was sprayed with release agent, as explained above. Table II describes the release characteristics of three tested systems. Comparative Samples 1 and 2 demonstrate results obtained from two different release agents which are not according to the invention. Sample 1 demonstrates the results obtained from the release agent composition according to the invention. For Comparative Sample 1 and Sample 1, after the tenth board was made, additional boards were made without applying release agent to the loose wood flake mat surfaces. For Comparative Sample 2, after the seventh board was made, an additional board was made without applying the release agent.

TABLE II

| Board # | Comparative Sample 1 RUBILON® RE 4099 release agent @0.25 gm/ft² (polysiloxane emulsion) | Comparative Sample 2 Oleic acid emulsion @1.0 gm/ft² | Sample 1 @1.0 gm/ft² |
| --- | --- | --- | --- |
| 1 | 5 | 5 | 5 |
| 2 | 5 | 5 | 5 |
| 3 | 5 | 5 | 5 |
| 4 | 5 | 4 | 5 |
| 5 | 5 | 4 | 5 |
| 6 | 5 | 5 | 5 |
| 7 | 5 | 4.5 | 5 |
| 8 | 5 | 1 | 5 |
| 9 | 5 | Stop test | 5 |
| 10 | 5 |  | 5 |
| 11 | 5 |  | 4.5 |
| 12 | 5 |  | 5 |
| 13 | 5 |  | 5 |
| 14 | 4 |  | 5 |
| 15 | 4 |  | 5 |

As can be seen from the data, all three of the systems provide adequate release (rating >4) when release agent is sprayed every time. However, Comparative Sample 2 has essentially no release memory. The addition of a small amount of an organic alcohol functional polysiloxane with the oleic acid (in accordance with the invention) significantly improves the memory up to the level of the polysiloxane emulsion alone. As will be seen in the examples to follow however, the 100% polysiloxane release agent results in excessive press build-up, making it an industrially impractical release solution. With prior art release agents, good release memory usually meant a high build-up rate. The current invention has both good memory and a controllable (much lower) press build-up rate.

Example 4

Press Build-up Testing

A test method was developed to quantify the build-up that deposits on the platen of the press over many sequential pressings. The method uses a series of composite (OSB) panels, as described in Example 3 above, but with the addition of four thin carbon steel shim stock pieces (130 mm×130 mm) placed on the surface of each panel prior to pressing. After each pressing, the shims are removed and weighed with an analytical balance and the weight gain, attributed to the release agent build-up, is recorded after each press cycle. FIG. 1 displays the measured (.) and averaged (--) weight gain on the shims vs. board number. The emulsion of polysiloxane without carboxylic acid (Comparative Sample 3) is provided as a comparison example not according to the invention. The oleic acid/polysiloxane combined emulsion (Sample 2) is in accordance with the invention.

This data reflects the problems that have been experienced regarding build-up on press platens and screen surfaces. The comparative emulsion of the siloxane without the carboxylic acid shows a steady increase in build-up, which would be expected to cause processing problems over a period of time. The combined oleic acid and polysiloxane emulsion, according to the invention, by contrast, shows a significantly reduced build-up rate. Past experiences indicate this build-up rate would be acceptable in industrial scale processing.

In the Comparative Sample 3 above, the Cirrasol 1087 is a fatty acid ester of ethoxylated sorbitol, commercially available from the Uniquema Division of ICI PLC. This additive is used as an emulsifying agent, and is free of carboxylic acid groups. The polysiloxane compound used above in both Comparative Sample 3 and in Sample 2 was TEGOSTAB® B8942, commercially available from Th. Goldschmidt & Company. TEGOSTAB® B8942 and TEGOSTAB® B8942LO are both the same resin, but the "LO" variant has been treated to remove an odiferous impurity. Both variants of TEGOSTAB® B8942 are suitable for use in the invention, but the "LO" version has less odor.

What is claimed:

1. A release agent composition comprising:
    (a) a carboxylic acid comprising at least six carbon atoms and at least one free carboxylic acid group, and
    (b) a polysiloxane comprising at least one organically bound active hydrogen group, wherein the carboxylic acid and the polysiloxane are separate molecular entities and the organically bound active hydrogen group is selected from the group consisting of a primary alcohol group and a secondary alcohol group; and
    (c) a carrier;
    wherein the carrier is selected from the group consisting of water, ethanol, isopropanol, and mixtures thereof.

2. A release agent composition comprising:
    (a) a carboxylic acid comprising at least six carbon atoms and at least one free carboxylic acid group, and
    (b) a polysiloxane comprising at least one organically bound active hydrogen group, wherein the carboxylic acid and the polysiloxane are separate molecular entities and the organically bound active hydrogen group is selected from the group consisting of a primary alcohol group and a secondary alcohol group; and
    (c) a carrier; and
    (d) a surfactant.

3. The composition of claim 2, wherein the surfactant is selected from the group consisting of ethoxylated alkylphenols, ethoxylated aliphatic linear alcohols, and mixtures thereof.

4. A release agent composition comprising:
    (a) a carboxylic acid comprising at least six carbon atoms and at least one free carboxylic acid group,
    (b) a polysiloxane comprising at least one organically bound active hydrogen group,
    (c) a carrier, and
    (d) a surfactant, wherein the carboxylic acid and the polysiloxane are separate molecular entities and the organically bound active hydrogen group is selected from the group consisting of a primary alcohol group and a secondary alcohol group.

5. The composition of claim 4, wherein the carboxylic acid is selected from the group consisting of oleic acid, linoleic acid, linolenic acid, ricinoleic acid, lauric acid, steric acid, adipic acid, dimer or trimer fatty acids, 2-ethyl-1-hexanoic acid, montanic acid, palmitic acid, sebacic acid, and mixtures of thereof.

6. The composition of claim 4, wherein the carrier is selected from the group consisting of water, ethanol, isopropanol, and mixtures thereof.

7. The composition of claim 4, wherein the surfactant is selected from the group consisting of ethoxylated alkylphenols, ethoxylated aliphatic linear alcohols, and mixtures thereof.

8. A process for producing composite lignocellulosic articles comprising the steps of:
    (a) providing a lignocellulosic material in fibrous or particulate form, (b) providing a pressing means having at least one metal press member having an inner surface and an outer pressing surface,
(c) providing an isocyanate containing adhesive,
(d) providing a release agent composition comprising:
  (i) a carboxylic acid comprising at least six carbon atoms and at least one free carboxylic acid group, and
  (ii) a polysiloxane comprising at least one organically bound active hydrogen group
(e) causing said release agent composition to be applied onto at least a portion of the outer pressing surface of at least one metal press member on said pressing means, to form at least one release agent treated pressing surface,
(f) combining said lignocellulosic raw material with said isocyanate containing adhesive to form a loose mass having free organically bound isocyanate groups present thereon,
(g) pressing said loose mass into a solid shaped object by using the at least one release agent treated pressing surface, and
(h) releasing said solid shaped object from said treated pressing surface.

9. The process of claim 8, wherein at least one release agent treating pressing surface is maintained at a temperature from 200° F. to about 500° F. during the pressing.

10. A process for producing composite lignocellulosic articles comprising the steps of:
  (a) providing a lignocellulosic material in fibrous or particulate form,
  (b) providing a pressing means,
  (c) providing an isocyanate containing adhesive,
  (d) providing a release agent composition comprising:
    (i) a carboxylic acid comprising at least six carbon atoms and at least one free carboxylic acid group,
    (ii) a polysiloxane comprising at least one organically bound active hydrogen group, and
    (iii) a carrier
  (e) causing said release agent composition to be applied to the lignocellulosic material,
  (f) combining said lignocellulosic raw material with said isocyanate containing adhesive, to form a loose mass having free organically bound isocyanate groups present thereon,
  (g) pressing said loose mass into a solid shaped object by using the pressing means, and
  (h) releasing said solid shaped object from said pressing means.

11. The process of claim 10, wherein the release agent further comprises a surfactant.

12. The process of claim 10, wherein the carrier is water.

* * * * *